United States Patent [19]

Eriksson

[11] Patent Number: 5,195,624
[45] Date of Patent: Mar. 23, 1993

[54] ARRANGEMENT IN SCREW THREAD CUTTING APPARATUS

[75] Inventor: Alf Eriksson, Nacka, Sweden

[73] Assignee: Tapmatic International Corporation (Tic AG), Kriessern, Switzerland

[21] Appl. No.: 630,393

[22] Filed: Dec. 18, 1990

Related U.S. Application Data

[63] Continuation of Ser. No. 289,307, Dec. 23, 1988, abandoned.

[30] Foreign Application Priority Data

Jun. 8, 1988 [SE] Sweden ................................ 8802148

[51] Int. Cl.⁵ ............................................ F16D 43/20
[52] U.S. Cl. .................................. 192/56 R; 192/138; 192/143
[58] Field of Search ...................... 192/56 R, 138, 143

[56] References Cited

U.S. PATENT DOCUMENTS

| | | | |
|---|---|---|---|
| 2,940,571 | 6/1960 | Bernhard | 192/56 R |
| 3,032,156 | 5/1962 | Eriksson | 192/56 R |
| 3,884,334 | 5/1975 | Eriksson | 192/56 R |
| 4,655,103 | 4/1987 | Schreiber et al. | 192/56 R X |

Primary Examiner—Leslie A. Braun
Assistant Examiner—Nicholas Whitelaw
Attorney, Agent, or Firm—Joseph R. Evanns

[57] ABSTRACT

A screw thread cutting apparatus (tapping attachment) which is provided with a clutching apparatus within the attachment, having the capability of de-clutching the drive from the driver in the event of excessive torque. The clutching apparatus involves a clutching member or members carried by the driver and a clutching member or members carried by the driven part, and a displaceable clutching member which can produce a clutching or de-clutching action between the other members. The clutching apparatus can be built into an adapter for holding a tap provided with quick change capability. The clutching apparatus can also be built directly into the driver.

5 Claims, 4 Drawing Sheets

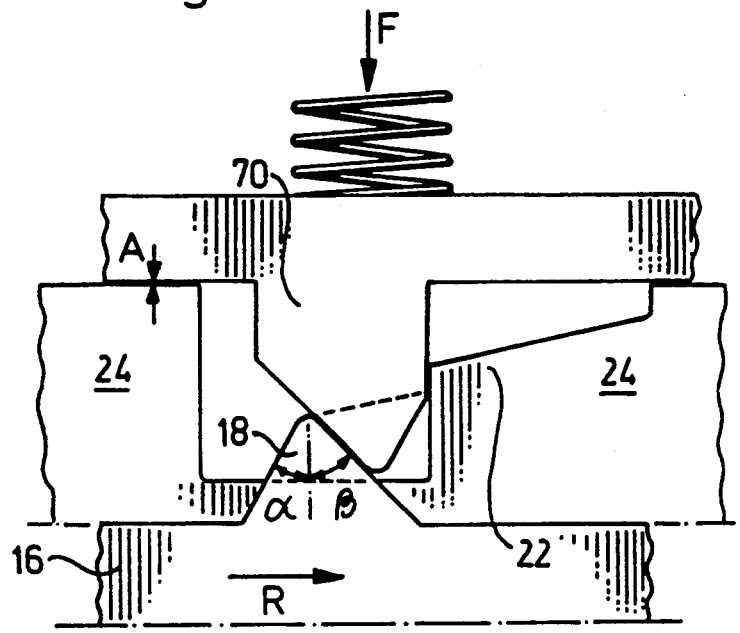
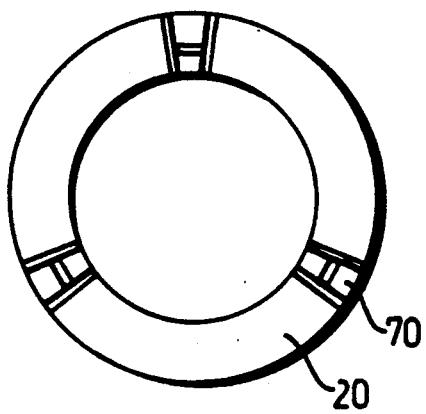
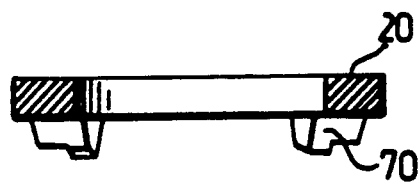

ARRANGEMENT IN SCREW THREAD CUTTING APPARATUS

This is a continuation of copending application Ser. No. 07/289,307 filed on Dec. 23, 1988.

The present invention relates to an arrangement in a screw thread cutting apparatus, including a driving part, a driven part and a clutch element intermediately disposed therebetween with torque transmitting means, which are in mutual engagement when torque is transmitted between the parts, but when a predetermined value of the torque is exceeded they slip from the position of engagement by an axial displacement of the intermediate element against the bias of a spring.

There are arrangements of this kind in the prior art, e.g. according to the U.S. Pat. Nos. 3,032,156 and 3,884,334, and according to these patents the torque transmission is unloaded when the thread tap reaches the bottom of a hole, e.g. when thread cutting in buttoming holes.

The chief object of the present invention is to provide an arrangement which is simplified and thereby cheapened in manufacture, compared with the above-mentioned known arrangements.

Another object is to improve the function considerably, in order to meet the continuously increasing demands for higher cutting speeds, while at the same time satisfying the need for smaller and smaller dimensions to enable use in automatic machine tools.

The arrangement in accordance with the invention includes, as with the arrangements according to the previously mentioned U.S. patents, an annular element with clutch means, which transmit the torque from a driving part, having clutch means suited to the annular element, to a driven part, similarly with clutch means suited to the annular element. The mentioned objects of the invention are achieved in that the torque transmitting means on the annular element are preferably in the form of fixed dogs or teeth engaging in the same way with the torque transmitting means on the driving and driven parts.

The annular element dogs can be radially divided into two concentric segments, which can be situated peripherally in the same position, but also mutually, angularly displaced.

Other objects and advantages are achieved by the arrangement in accordance with the invention having been given the distinguishing features disclosed in the following claims.

The invention will now be described in the following in connection with embodiments of the apparatus illustrated on the drawings.

FIG. 7 is a section to a larger scale, similar to FIG. 3, showing a modified embodiment of the clutch teeth (or dogs).

FIG. 8a is a plan and FIG. 8b is a side view of an annular element.

Figure 1:
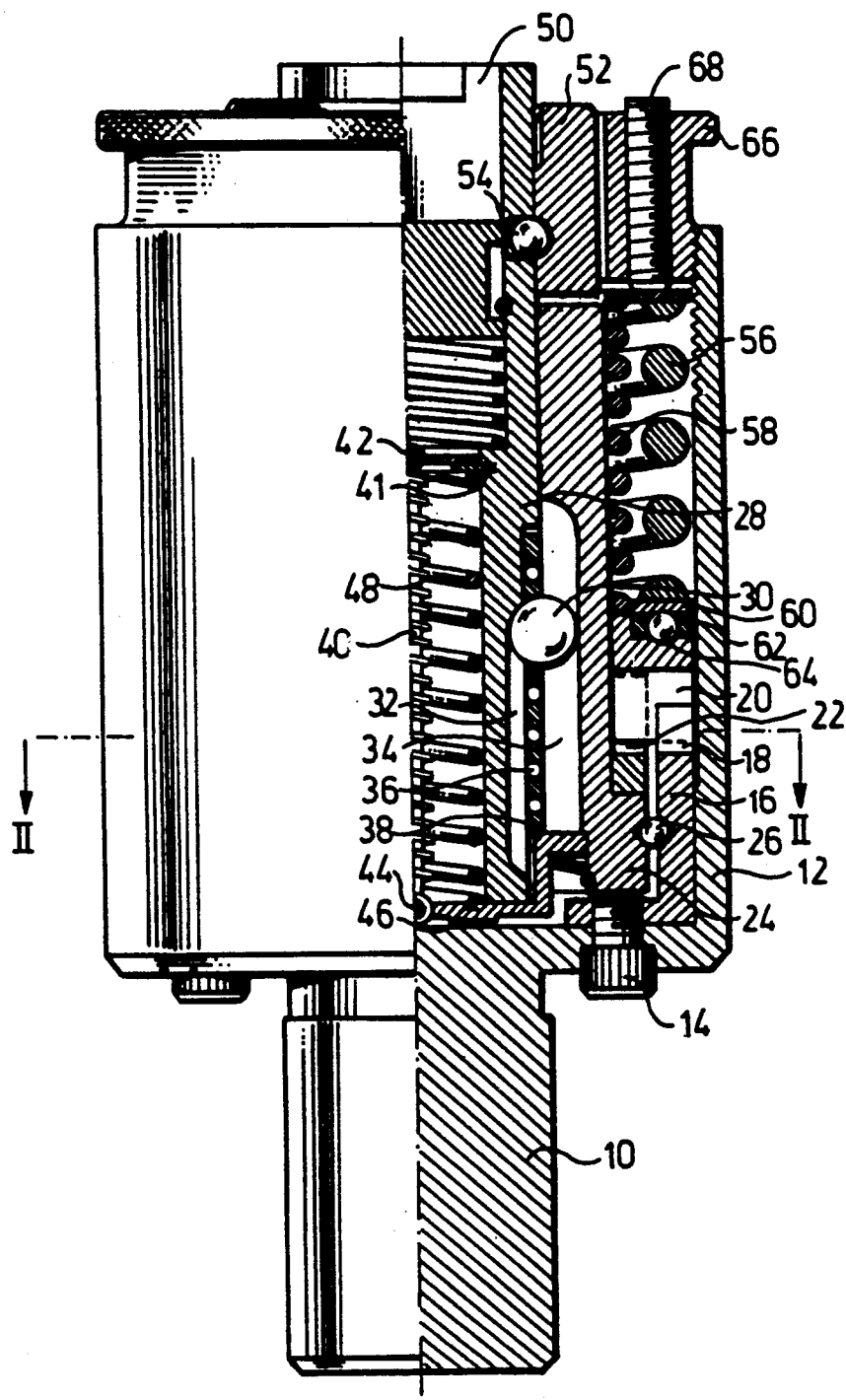
FIG. 1 is a longitudinal half section through a thread cutting apparatus provided with a torque transmitting clutch in accordance with the invention.

FIG. 1 is a longitudinal half section through a thread cutting apparatus, which includes a drive spindle 10 merging into a sleeve-like part 12, Although this Figure is oriented with the spindle 10 downwards, such terms as "up" and "down" in the text refer to the working position of the apparatus with the spindle upwards. On the inside of the sleeve-like part 12 there is a sleeve 16 fastened with the aid of screws 14, the end of this sleeve projecting into the sleeve-like part 12 being provided with dogs 18 disposed for engagement via an intermediate clutch or annular element 20 with dogs 22 disposed on the driven part, as described in more detail below. A guide body 24 is mounted for rotation but not axial movement in the sleeve 16, with the aid of balls 26 running in grooves in the sleeve 16 and guide body 24. A cylindrical sliding body 28 is mounted in the guide body 24 and together with the latter constitutes the driven part of the thread cutting apparatus. The guide body 24 and cylinder 28 are limitedly, axially displaceable relative each other, but are mutually, non-rotatably connected with the aid of balls 30 mounted in an exterior, axial groove 32 in the body 28 and a corresponding interior, axial groove 34 in the guide body 24. The mounting between the guide body 24 and cylinder 28 is achieved with the aid of a large number of small balls 36 arranged in a ball cage 38 which has openings for the balls 30. Balancing of the axial movement of the body 28 is obtained by its being suspended in a helical spring 40 which is disposed in a central bore in the body 28 and fastened between a lower holder 42 and an upper pin 44, which is disposed in a cap 46 mounted on the guide body 24. Between the cap 46 and a locking ring 41 there is mounted a spring 48 surrounding the spring 40 and with greater bias than the latter. The body 28 is provided with a bore 50 at its free end, as well as a sliding sleeve 52 and detent balls 54 for accommodating an unillustrated holder intended for a thread cutting tap in a manner known per se within this field of the art.

When the drive spindle 10 rotates torque is transmitted from the dogs 18 on the sleeve 16, through the intermediate annular element 20 and to the dogs 22 on the guide body 24. During this torque transmission, the annular element 20 is urged into engagement with the dogs 18, 22 by two mutually concentrical springs 56, 58 of different strengths, of which the more powerful spring, the spring 56 in the case of the illustrated embodiment, exerts a force on the annular element 20 via an intermediate circular plate 60 and ball cage 62 and balls 64, so as to reduce the friction between the springs and the annular element 20. The weaker spring 58 slides against the inner lip of the annular element and when the clutch is released or disengaged will generate a weak frictional force which is operative in maintaining the annular element 20 free from load until rotation of the machine spindle has ceased and the direction of rotation is subsequently reversed, this course of events being described in more detail hereinafter.

The ends of the springs 56, 58 distal from the annular element 20 abut a setting screw 66 which is screwed into a screw-threaded hole, such that the force exerted by the spring can be adjusted by screwing the screw 66 into or out of the sleeve 12. The screw 66 is locked in its positional setting with the aid of a further screw 68 which acts against a slot in the setting screw 66 and is screw-threaded therein.

When the tap reaches the bottom of a hole, e.g. when tapping a bottoming hole, the rotation of the body 28 is arrested, and thereby also that of the guide body 24 with the dogs 22. A predetermined torque set with the aid of the spring bias F (FIGS. 3a, 3b) from the springs 56, 58 is exceeded, and the clutch is released, which will now be described in connection with FIGS. 2 and 3a–3b. In FIG. 3a, Y denotes the engagement between the dog 18 on the driving part 16 against the dog 70 of the annular element 20, Z denotes the engagement between the annular element 20 dog 70 and the dog 22 on the driven part 24, while X denotes the rise on the top surface of the dog 18 on the driving part 16. As the clutch disengages, the dog 18 continues to move in the threading direction denoted by the arrow R, and first presses up the annular element 20 the distance Z against the spring bias F. The top surface on the dog 18 then lifts the annular element 20 the distance X against the spring bias F, while the dog 70 on the annular element 20 is moved up the rise formed on the dog 22 on the driven part or guide body 24 and formed as an unloading ramp, until the annular element dog 70 has reached the fully unloaded position illustrated by dashed lines to the right in FIG. 3a. In this embodiment, the driven part or guide body 24 and the annular element 20 are arrested while the driving part or sleeve 16 continues to rotate. As long as the latter continues to rotate in the driving direction R, the annular element 20 is kept in its upper unloaded position by sliding friction from the spring 58 which rotates synchronously with the driving sleeve 16 in this embodiment. Re-engagement of the clutch takes place by the spring bias F urging the dogs 70 of the annular element 20 down between the dogs 18 and 24 on the sleeve 16 and guide body 24, respectively, when rotation ceases and reversing starts. For this to take place, and thus for the clutch to be self-engaging, it is required that the angle of rise on the ramp of the guide body dog 24 is adapted such that the spring bias by itself is capable of turning the annular element 20 backwards to the starting position. A smaller angle for the ramp can be accepted in certain embodiments, but the re-engagement of the clutch is then ensured by the resistance to rotation from the threading tap in the threaded hole, and the resistance due to the inertia of the arrested parts.

Figure 2:
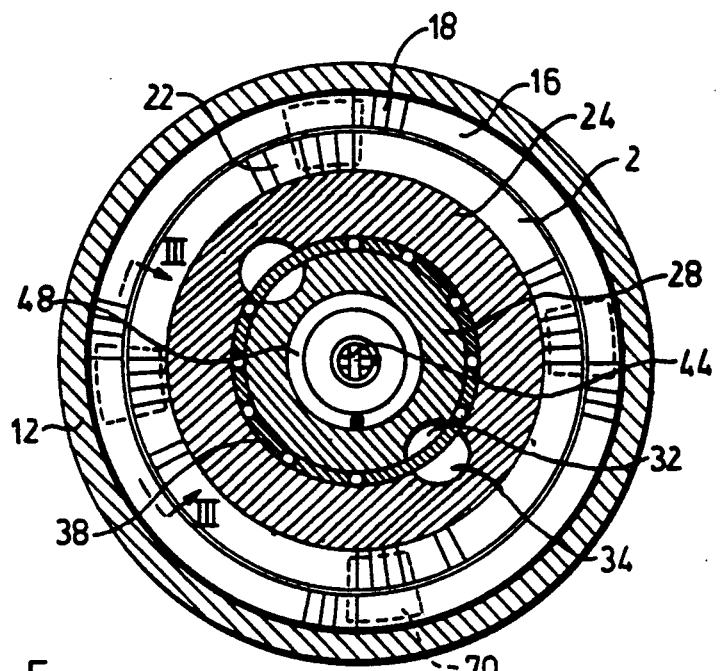
FIG. 2 is a section along the line II—II in FIG. 1.
Figure 3A:
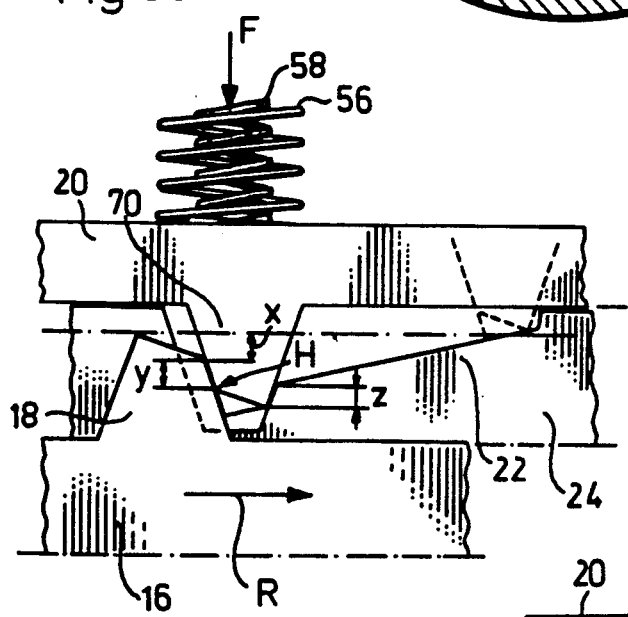
FIGS. 3a, 3b are sections to a larger scale through the clutch in FIGS. 1 and 2, and illustrate the dogs in the engagement position.
Figure 3B:
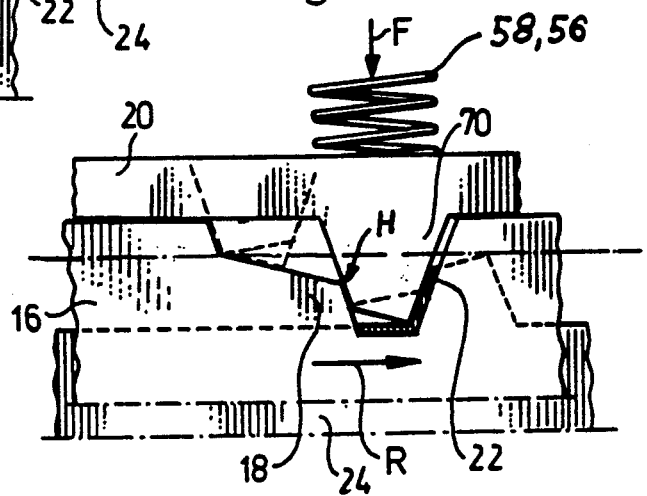

An alternative embodiment of the arrangement according to FIGS. 1 and 2 is illustrated in FIG. 3b, in which the unloading ramp is disposed on the driving part. The same reference characters have been used for FIG. 3b as in the previous embodiment, and the function is the following: When the preset torque is exceeded, the annular element 20 is pressed upwards against the spring bias F until the annular element dog 70 reaches the corner H of the dog 18 on the driving part 16, this dog forming at the same time the unloading ramp for the dog 70. Rotation of the annular element 20 is then interrupted but only momentarily during the movement up along the ramp of the dog 18, and when the annular element 20 has come so high up that its dog 70 can pass freely over the dog 22 of the driven guide body 24, the annular element 20 continues to rotate synchronously with the driving part or sleeve 16 until the latter stops. When the machine spindle 10 ceases to rotate, or alternatively is reversed, the dogs return from the unloaded state to a new driving state in the same way as has been described in connection with FIG. 3a. In the embodiment illustrated in FIG. 3b, the clutch spring or springs 56, 58 are suitably disposed between the annular element 20 and an adjusting nut for the spring which is threaded on to the driven part or guide body 24. The adjusting nut or screw can also be positioned on the driving part or the sleeve 16, but it is then suitable to provide a light sliding friction between the driven part 24 and the annular element 20 for facilitating the re-engagement. In the embodiment illustrated in FIG. 3b, the inner top surface of the annular element dog 70 works against the dog 22 of the driven guide body 24, and at a lower level than its outer top surface, which works against the dog 18 of the driving part 16. In the embodiment illustrated in FIG. 3a this relationship is the reverse, but the embodiments can be switched about and adapted for the best function and manufacture.

Figure 4:
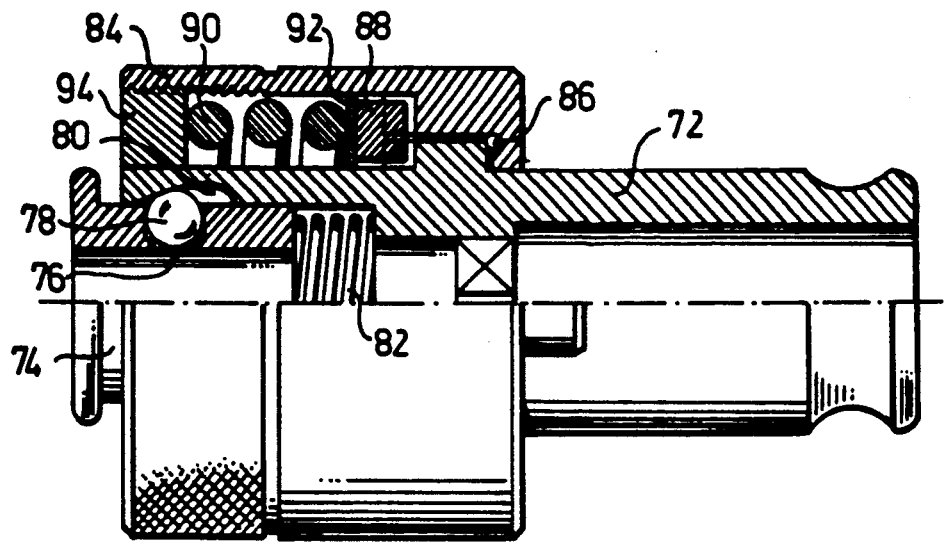
FIG. 4 is a longitudinal half section through another embodiment of a clutch in accordance with the invention.

In FIG. 4 the numeral 72 denotes a clutch body having at its left hand end a sleeve 74 which can slide internally in the body 72. The sleeve 74 is provided with circumferential grooves 76 accommodating detent balls 78, which move against a cam surface 80 on the internal cylindrical surface of the body 72 when the sleeve is displaced axially in the body, In the illustrated position, in which the sleeve 74 is acted on by the bias from a spring 82, the detent balls 78 are guided by the cam surface 80 so that with a portion of their spherical surface they thrust against the interior of the sleeve 74. The shank on a threading tap or the like (not shown) can thus be retained by friction in the sleeve 74 for rotation with it, e.g. with the aid of a square dog or the like. When the sleeve 74 is moved to the right in relation to the body 72, the detent balls can move outwards against the cam surface 80 and the threading tap or the like is released from the sleeve.

The clutch body 72, which is the driven part of the clutch, is surrounded by a clutch housing 84 which is the driving part, and which is mounted axially with the balls 86 in order to take the axial thrust and give free rotation relative to the body 72. As with the embodiment illustrated in FIGS. 1–3, the clutch includes an annular element 88 with dogs similarly engaging in dogs on the driven clutch body 72 and the driving clutch housing 84. The annular element 88 is kept in engagement with the dogs on the driven and driving parts with the aid of a helical spring 90. When a predetermined torque has been exceeded, the driven part 72 stops, while the driving housing 84 continues to rotate, the dogs of the annular element 88 moving upwards in a manner described previously, on a ramp, e.g. disposed on the dog of the driven part 72, so that the clutch engagement via the annular element 88 ceases. As long as the housing part 84 continues to rotate, the annular element 88 is kept in its unloaded position by the sliding friction from the spring 90 which rotates synchronously with the housing 84. Alternatively, the spring 90 stops together with the annular element 88, and in this case the friction between the spring and the housing 84 via an adjusting ring 94, screwed into the housing 84, constitutes the force retaining the annular element 88 in the unloaded position as long as the housing rotates in the thread cutting direction. To ensure re-engagement when rotation ceases and reversing starts, the embodiment illustrated in FIG. 4 has in certain cases a washer 92 inserted between the spring 90 and the annular element 88, this washer 92 engaging with its interior circumference against the driven sleeve 72 with sliding friction. On reversal, the annular element 88 will thus be braked via the washer 92 engaging with friction against the sleeve 72 so that it is ensured that the annular element will slide off the ramp and back to the position between the dogs of the driven body 72 and the driving housing 84. The braking friction from a means such as the illustrated washer 92, or the like, will be of the greatest value, however, when the ramp is situated on the driving part. The spring 90 is mounted between the washer 92 and the adjusting ring 94, with the aid of which the spring bias, and thereby the setting of the torque at which the clutch disengages, can be varied.

Figure 5:
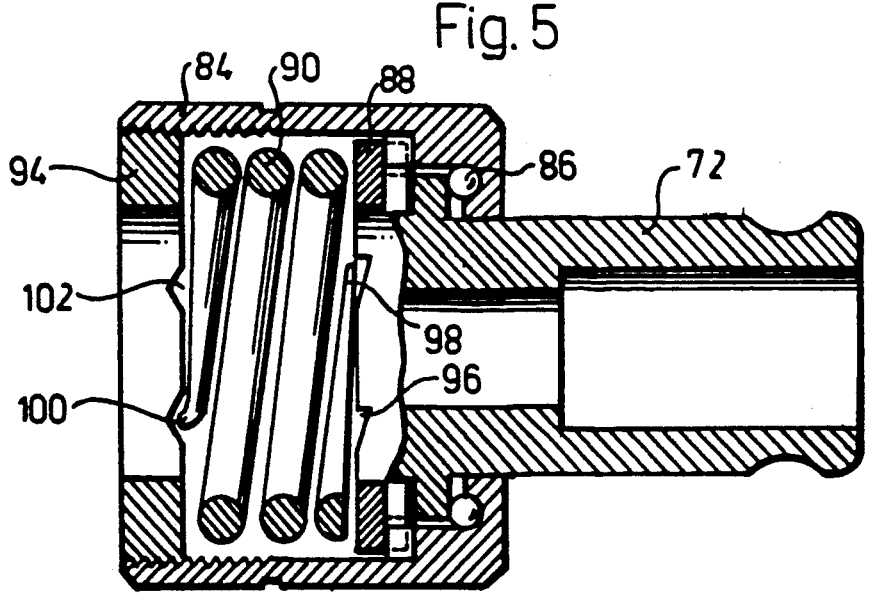
FIG. 5 is a longitudinal section through a still further embodiment of a clutch in accordance with the invention.

An alternative embodiment is illustrated in FIG. 5 for re-engaging the clutch on reversal. Here against the same character references have been used as with the embodiment according to FIG. 4, although the sleeve 74 has been excluded for the sake of simplicity. The clutch body 72 is shown partially cut away in the Figure, which also shows the driving housing 84 and the spring 90 arranged between the annular element 88 and the ring 94. The engagement surface of the annular element 88 against the spring 90 has small recesses 96, which have a sharp angle towards the plane of rotation in the re-engaging direction of the annular element, and a small angle to the plane of rotation in the disengagement or unloading direction of the annular element 88. This is valid when the ramp is situated on the driven part 72 and the helical spring 90 has the same winding direction as the thread cutting direction. When the ramp is situated on the driving part 84 and the annular element 88 continues to rotate with the driving housing 84 at a clutch release the angles of the recesses and the spring winding direction are the opposite. In this embodiment the clutch spring 90 is a helical spring rotating synchronously with the driving housing 84, and when the rotation of the annular element 88 is interrupted for disengagement of the clutch, the end tip 98 of the spiring 90, which can be ground down but can also be cut perpendicularly, continues to move easily over the recesses 96 as long as the housing 84 continues to rotate in the thread cutting direction. The other end 100 of the clutch spring 90 engages, as described, against the flat, torque-presetting ring 94. The engagement surface of the ring 94 also has depressions 102, the surface of which are inclined to the plane of rotation in the direction of thread cutting and the reversing direction. The outer tip of the spring end 100 is suitably somewhat bent for accommodation in the depressions 102. The resistance in these depressions between the spring 90 and the screw 94 will therefore be greater than the sliding resistance between the spring 90 and the annular element 88 in the driving direction. The resistance in the reversing direction is quite sufficient for returning the annular element 88 from the unloaded or disengaged position to the driving position via the spring 90 and its positive engagement at its other end 98 against the recesses 96 of the annular element 88. However, the resistance is not so great to hinder presetting of the engaging force by rotation of the ring 94. The arrangement can be reversed, so that the ring 94 has the positively driving recesses corresponding to the recesses 96 in the re-engaging direction and the annular element has the depressions corresponding to the depressions 102 with a slope in both directions. In the first-described arrangement, there is gained that a lesser rotating mass will be arrested for disengagement of the clutch simultaneously as the quantity of heat generated by sliding friction has a longer path to traverse through the entire wire length of the spring 90. Clutch disengagement only encompasses a fraction of a total thread cutting cycle. Due to the long heat conducting path, the heat energy thus dispersed gently to other machine parts and the atmosphere, and will not be noticeable on the surface of the tool where the user normally grips it.

The effect described with the different serrations or depressions 96, 102 can also be achieved with good action via the surface finish of the parts included, i.e. the annular element 88, contact surfaces of the spring 90 and the contact surface of the ring 94. For example, if the contact surface of the annular element is smooth and the contact surfaces of the spring against the annular element 88 and ring 94 are rough as well as the contact surface of the ring 94 to the spring 90, the spring 90 will always slide against the annular element 88 and unloading or disengagement will be reliable. The spring 90 will also be reversible so that no assembly errors can occur. Re-engagement does not have large margins, but these are sufficient in an otherwise correct implementation.

Figure 6:
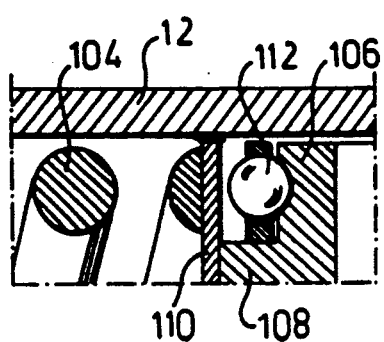
FIG. 6 is a section to a larger scale through an alternative arrangement for seating the clutch spring against the annular element.

FIG. 6 illustrates an alternative embodiment of an arrangement for reducing friction between the clutch spring and the annular element to a desired level in such cases where it is suitable to have only one strong clutch spring, e.g. in a compact adapter intended for large thread dimensions. In this embodiment a clutch spring 104 with its rise in the thread cutting direction is arranged in a sleeve-like part 12 of the same type as in FIG. 1. The embodiment also includes an annular element 106 with an axial flange 108 at its inner periphery. The clutch spring 104 presses against a relatively thin washer 110, which is hard but resilient. For low prestressing of the spring 104 the washer 110 only has contact with the inner flange portion 108 of the annular element 106, and there is only sliding friction when the clutch disengages. When the clutch spring 104 is given greater bias, the washer 110 is given a weakly conical configuration and comes into contact against a ball bearing 112 arranged between the flange 108 of the annular element 106 and the part 12. An increase of the sliding friction is thus counteracted and further increase of the pressure from the spring 104 is taken up by the ball bearing 112.

In an alternative embodiment similar to the one in FIG. 3b, FIG. 7 illustrates an example of the implementation of the dogs which is suitable particularly for small units with small mass. The reference characters for the included parts are the same as those used in FIGS. 3a and 3b. It will be seen from the figure that there is a driving part or sleeve 16 for rotation in the thread cutting direction R such that via the dog 70 of the annular element 20 the dog 18 of the sleeve 16 drives a driven part or guiding body 24 via its dog 22. The annular element 20 has an outer driving part or dogs providing a torque releasing function with respect to the dogs 18 of the driving part 16, these outer dogs having rounded tops for automatic, mutual re-engagement with the aid of the clutch spring. Re-engagement will be independant of resistance from the thread cutting tap and the inertia of non-rotating parts. The annular element 20 also has a purely driving abutment portion with positive abutment in both driving and reverse threading directions. Since the angle $\alpha$ is less than the angle $\beta$, the reversing torque will be greater than the thread cutting torque, which is a safety factor in automatic operation. At the same time, the angle relationship can be balanced to give a suitable value when it is desired to have a certain safety against tap breakage in reversing also, primarily when thread cutting is done manually. Both parts of the dog 70 of the annular element 20 can also be mutually displaced in the circumferential direction if so desired. An axial abutment, as illustrated at A, between the bottom of the annular element 20 and a flange (continuous or broken) on the driven part 24 provides a light, sliding friction between the parts so that the dogs automatically go into contact at the driving surfaces.

A plan and side view of an annular element 20 with dogs 70 are respectively illustrated in FIGS. 8a and 8b.

As illustrated in FIG. 1, the spring which loads the annular element 20 to like engagement with the dogs in the driving and driven parts comprises two concentric helical springs 56, 58, of which one 56 is stronger than the other 58. It will be seen from FIG. 1 that the stronger spring 56 is mounted against the annular or clutch element 20 with the aid of ball bearings 62, 64, while the weaker spring 58 is mounted directly against the element 20. The weaker spring 58 may also be longer than the stronger spring 56, which results in that the clutch can be loaded with a small force for the lower capacity range of the apparatus, which thereby becomes very sensitive to small taps where the risk of breakage is greatest.

I claim:

1. In thread cutting apparatus, including a driving part, a driven part, and a displaceable clutch member intermediately disposed therebetween with torque transmitting means on the displaceable clutch member and on said parts, driving part torque transmitting means on the driving part and driven part torque transmitting means on said driven part a displaceable clutch member comprising an annular element with torque transmitting means, said latter torque transmitting means being engageable with the torque transmitting means on both the driving and the driven parts, and spring means providing bias acting against the clutch member, whereby when torque is transmitted between the parts, and a predetermined value of the torque is exceeded, said annular element moves substantially axially away from driving engagement with said driving and driven parts, said torque transmitting means of said driven part having a ramp member engageable by the torque transmitting means of the clutch member for moving said clutch member in an axial direction for displacement, the torque transmitting means on one of said parts having a contour engageable with the torque transmitting means on said clutch member whereby to hold the said clutch member out of driving engagement when said predetermined value of torque has been exceeded.

2. Arrangement in a thread cutting apparatus, including a driving part having driving part torque transmitting means, a driven part having driven part torque transmitting means and clutch means intermediately disposed between said driven part and said driving part, said clutch means comprising a substantially annular displaceable clutch member having torque transmitting means engageable in driving engagement with said driven part torque transmitting means and said driving part torque transmitting means, said clutch means further including resilient means comprising spring means biased to urge said substantially annular displaceable clutch member into driving engagement and being adjustable to be responsive to torque generated by operation of said thread cutting apparatus, said driven part torque transmitting means and said driving part torque transmitting means including means for moving said substantially annular displaceable clutch member out of engagement with said driving part torque transmitting means and against force exerted by said adjustable resilient means by axial displacement of said substantially annular displaceable clutch member at preset value of said force exerted by said adjustable resilient means corresponding to preset value of torque generated by operation of said thread cutting apparatus, and said means for moving said substantially annular displaceable clutch member out of engagement with said torque transmitting means of said driven part and against force exerted by said adjustable resilient means comprising ramp means disposed at an inclination to the rotational plane of said driven part, the torque transmitting means of said substantially annular displaceable clutch member comprising at least one dog member disposed adjacent said ramp means to be disengageable from the torque transmitting means of the driven part against said spring bias, said spring means including at least two concentric helical springs, of which one is stronger than the other.

3. Arrangement as claimed in claim 2, characterized in that the weaker spring is longer than the strong spring.

4. The invention as set forth in claim 2 wherein the stronger spring is mounted against the displaceable clutch member by way of bearings and the weaker spring is mounted directly against the displaceable clutch member.

5. The invention as set forth in claim 4, wherein said spring has at least one recess having a configuration such that one end of said spring means is engageable with said recess for re-engagement of the clutch.

* * * * *